United States Patent [19]
Chardon

[11] Patent Number: 5,192,837
[45] Date of Patent: Mar. 9, 1993

[54] OBSTACLE DETECTOR SYSTEM INCLUDING AN IMPROVED CONNECTION ASSEMBLY

[75] Inventor: Jérôme Chardon, Courbevoie, France

[73] Assignee: Jaeger, France

[21] Appl. No.: 532,595

[22] Filed: Jun. 4, 1990

[51] Int. Cl.⁵ .............................................. H01H 3/16
[52] U.S. Cl. ............................. 200/61.41; 200/61.44
[58] Field of Search ............... 200/61.41, 61.42, 61.43, 200/61.44, 62; 439/271, 278; 49/26, 27, 28; 307/9.1, 10.1

[56] References Cited

U.S. PATENT DOCUMENTS

| | | | |
|---|---|---|---|
| 3,300,600 | 1/1967 | Blomquist | 200/50 |
| 3,662,491 | 1/1970 | Boyriven | 49/28 |
| 4,317,970 | 2/1980 | Hafner et al. | 200/61.43 |
| 4,358,646 | 1/1981 | Martinez | 200/5 R |

FOREIGN PATENT DOCUMENTS

2564971 5/1984 France .
0156698 2/1985 France .
871484 12/1957 United Kingdom .

Primary Examiner—A. D. Pellinen
Assistant Examiner—Michael A. Friedhofer
Attorney, Agent, or Firm—Blakely, Sokoloff, Taylor & Zafman

[57] ABSTRACT

An obstacle detector system interposed between a frame and an associated moving member, the system being of the type comprising an obstacle detector device including at least two electrically conductive tracks which are held apart at rest by spaces. The system comprises a connection assembly including a support core made of electrically insulating material, at least two separate electrically conductive elements carried by the support core and intended to make contact with respective ones of the tracks when the core is inserted inbetween, and an envelope suitable for engaging the outside surface of the obstacle detector device in order to clamp it against the support core and the electrically conductive elements in order to maintain electrical contact between the tracks and the elements and also to ensure that the detector device is sealed.

24 Claims, 5 Drawing Sheets

FIG_3

FIG_4

FIG_5

FIG_7

FIG_6

FIG_9

FIG_8

FIG_10

FIG_17

OBSTACLE DETECTOR SYSTEM INCLUDING AN IMPROVED CONNECTION ASSEMBLY

The present invention relates to the field of obstacle detector systems suitable for detecting the presence of an obstacle interposed between a frame and an associated moving member.

The present invention is particularly applicable to detecting an obstacle interposed on the displacement path of an electrically-driven motor vehicle window.

BACKGROUND OF THE INVENTION

Numerous obstacle detector systems have already been proposed for this function.

Still more precisely, the present invention relates to obstacle detector systems of the type comprising two electrically conductive tracks held apart at rest by resilient flexible means. When pressure due to an interposed obstacle is exerted on the obstacle detector, the resulting deformation of the tracks brings them into contact. The switching achieved in this way may be used, for example, to generate an alarm, or to reverse the displacement direction of the moving member. Such systems are described, for example, in the following patent documents: FR-A-2155729, FR-A-2564971, FR-A-2089279, FR-A-2171871, EP-A-015393, EP-A-0104414, EP-A-195908, DE-A-2142370, DE-A-2643505, DE-A-3424581, DE-A-3304400, DE-A-2719438, U.S. Pat. Nos. 3,812,313, 4,115,952, 3,710,050, 3,113,167, 3,118,984 and 3,154,303.

Previously proposed obstacle detector systems of the above-mentioned type are generally formed either as a tubular body of electrically insulating material carrying the two electrically conductive tracks on its inside surface, or as two (generally parallel) electrically conductive tracks which are separated by spacers made of an electrically insulating material.

In practice, it is observed that in spite of the numerous advantageous of these obstacle detector systems and in spite of the large amount of research that has been performed on this topic, as witnessed by the numerous documents mentioned above, such detectors have not yet been developed and used industrially.

However, there is considerable demand, in particular in the car industry, where electrically-driven windows are becoming common.

The object of the present invention is to improve the situation by proposing a new obstacle detector system fitted with a connection assembly which is not only reliable, robust, and cheap, but is also suitable for rapid connection to an arbitrary length of detector device while simultaneously ensuring that the system is sealed.

SUMMARY OF THE INVENTION

According to the present invention, this object is achieved by a system for detecting an obstacle interposed between a frame and an associated moving member, the system being of the type comprising an obstacle detector device including at least two electrically conductive tracks held apart at rest by resilient flexible means, wherein the system includes a connection assembly comprising:

a support core made of electrically insulating material;

at least two separate electrically conductive elements carried by the support core and intended to make contact with respective ones of the tracks when the core is interposed between them; and envelope means suitable for engaging the outside surface of the obstacle detector device in order to clamp against the support core and its electrically conductive elements in order to maintain electrical contact between the tracks and these elements and also in order to seal the detector device.

Theoretically, designing obstacle detector systems based on two electrically conductive tracks appears to be attractive. However, if one of the tracks should happen to be interrupted, then the system no longer operates.

Figure 1:
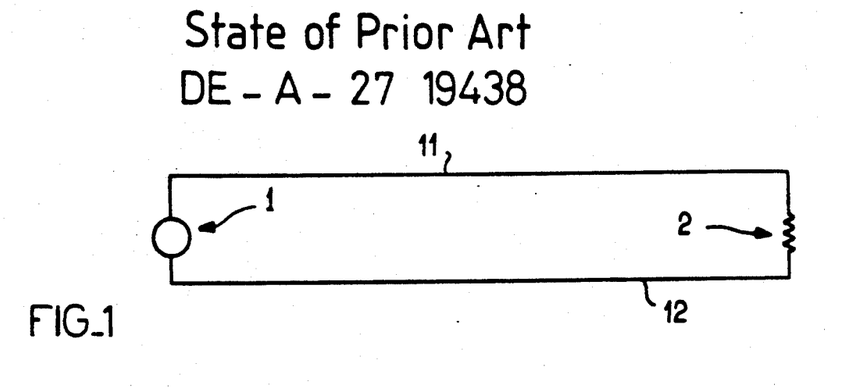
FIGS. 1 and 2 are described above and illustrate the prior art.

Attempts have been made to eliminate this drawback, for example as described in Document DE-A-27 19438 and as shown in accompanying FIG. 1, by connecting a first end of the tracks 11 and 12 to an electricity source 1, and connecting the second ends of the tracks 11 and 12 to a resistor 2.

At rest, if the tracks 11 and 12 are intact, current flows along the tracks via the resistor 2 even though the tracks are separate.

If at least one of the tracks 11 and 12 is damaged or cut, thereby making the system inoperative, this is detected by a drop in the rest current.

In contrast, an obstacle is detected by an increase in the current flowing along the tracks 11 and 12.

The prior system shown in accompanying FIG. 1 does not, however, give full satisfaction. Firstly the rest current is not accurately defined and this makes the test relatively difficult. Secondly, obstacle detection is not reliable. For example, if an obstacle is detected in the immediate vicinity of the second end of the tracks interconnected by the resistor 2, then the resulting current may be very low if the tracks 11 and 12 have non-negligible electrical resistance.

Figure 2:
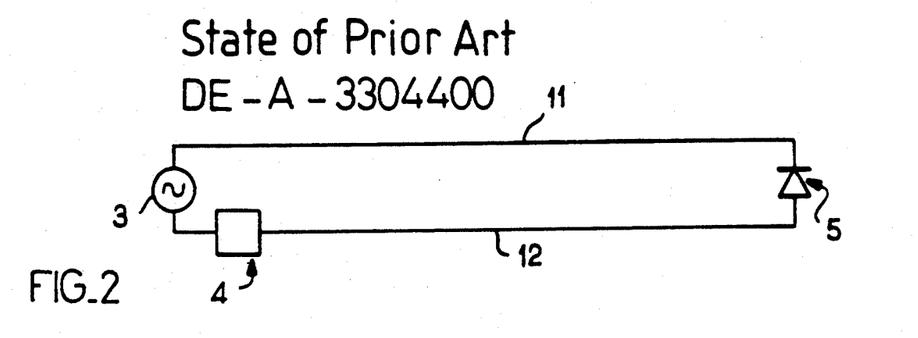

Proposals have also been made, as described in Document DE-A-33 04400, and as shown diagrammatically in accompanying FIG. 2, to connect an alternating electricity supply 3 in series with a "half-wave" relay 4 to the first ends of the tracks 11 and 12, and to connect a conventional blocking diode 5 to the second ends of the tracks 11 and 12.

The mean reast current flowing along the tracks 11 and 12 is not zero because of the diode 5. The relay 4 is therefore energized. If at least one of the tracks 11 and 12 is damaged, then the relay 4 is no longer powered.

Similarly, if an obstacle is detected, then the tracks 11 and 12 are brought into contact, and the diode 5 is short circuited. The mean current in the tracks 11 and 12 is then zero and the relay is not energized.

In conclusion, the relay 4 is energized only under normal operating conditions in the prior system as shown in FIG. 2, i.e. when the tracks 11 and 12 are intact and there is no obstacle.

However, the system shown in FIG. 2 does not give full satisfaction. In particular, it requires an alternating power supply and this is not directly available on most motor vehicles.

Another similar test apparatus is described in Document DE-U-8608064.

The present invention improves this situation by means of an obstacle detector system of the type specified above comprising a body of electrically insulating resilient material carrying two electrically conductive tracks or strips and including a DC electricity power supply which is connected via a resistance to the first ends of the tracks or strips, with a diode interconnecting the second ends of the tracks or strips and with voltage measurement means being connected to the first ends of the tracks or strips.

The obstacle detector device may include a deformable flexible elongate body placed between a support connected to a fixed frame and a decorative component which is rigid and which moves relative to the frame.

BRIEF DESCRIPTION OF THE DRAWINGS

Embodiments of the invention are described by way of example with reference to the accompanying drawings, in which.

DETAILED DESCRIPTION

The accompanying figures show an obstacle detector comprising a tubular body 10 made of electrically insulating material and carrying two electrically conductive tracks 11 and 12 on its inside surface.

Where appropriate, the detector device may be constituted merely by two electrically conductive tracks 11 and 12 separated by one or two spacers of flexible and resilient electrically insulating material.

The structure of the obstacle detector device including the two electrically conductive tracks 11 and 12 is not described in detail herein. Such a detector may be as described and shown, for example, in the numerous prior documents mentioned in the introduction to the present patent application.

However, it should be observed that it is preferable for the electrically conductive tracks 11 and 12 and the tubular body 10 carrying them on its inside surface (or the spacers inserted between the tracks, where applicable) to be coextruded and to be formed on the basis of a single material, together with a filler of electrically conductive material for the tracks 11 and 12.

Figure 3:
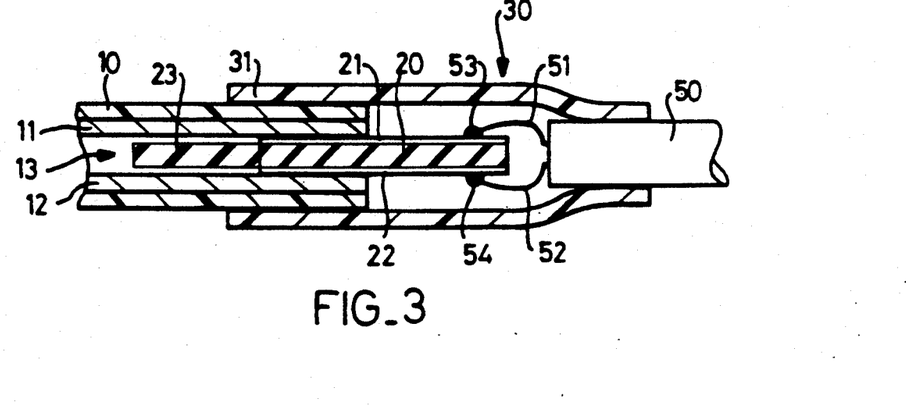
FIG. 3 is a diagrammatic longitudinal section through a connection assembly of the present invention.

FIG. 3 shows a connection assembly comprising a support core 20, two electrically conductive elements 21 and 22, and envelope means 30.

The support core 20 is generally plane. It is made of an electrically insulating material. The two electrically conductive elements 21 and 22 are separated and carried by opposite faces of the support core 20. The section of the support core 20 coated with the electrically coated elements 21 and 22 is substantially complementary to the empty section of the chamber 13 of the detector device 10 as defined between its tracks 11 and 12 (while preferably being slightly larger). Thus, the electrically conductive elements 21 and 22 make contact with respective ones of the tracks 11 and 12 when the core 21 is inserted therebetween.

An electric cable 50 having two conductors 51 and 52 can also be seen in FIG. 3, with the ends of the conductors being soldered to respective ones of the electrically conductive elements 21 and 22 at 53 and 54.

In the embodiment shown in FIG. 3, the envelope means 30 include a shrinkable sleeve 31 which is preferably heat-shrinkable. The ends of the sleeve are engaged respectively over the body 10 of the obstacle detector device and of the cable 50. After the heat-shrinkable sleeve 31 has been shrunk, it clamps both to the obstacle detector device 10 and to the cable 50. The heat-shrinkable sleeve 31 thus seals the system. It may also be observed that the heat-shrinkable sleeve 31 clamps the body 10 of the obstacle detector device onto the support core 20 and its electrically conductive element 21 and 22, thereby guaranteeing reliable electrical contact between the tracks 11 and 12 and the electrically conductive elements 21 and 22.

Where applicable, and as shown in dashed lines in FIG. 3, the support core 20 may be extended along the inside of the detector device beyond the ends of the electrically conductive elements 21 and 22 by means of an insert 23 of electrically insulating material which prevents the clamping effect of the shrinkable sleeve 31 bearing against the tracks 11 and 12 where they make contact.

Figure 4:
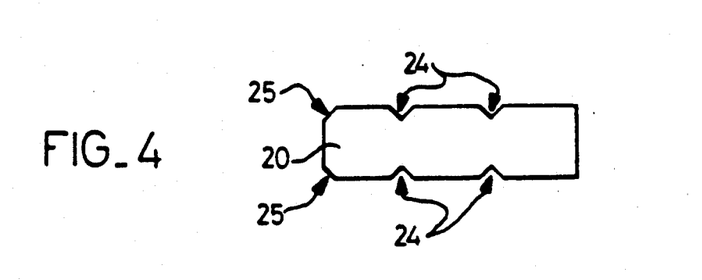
FIG. 4 is a diagrammatic plan view of a support core used in a connection assembly of the present invention.

As shown in FIG. 4, in order to reinforce the attachment of the support core 20 inside the detector device 10, at least some of the faces of the support core 20 and preferably also the corresponding edges of the electrically conductive elements 21 and 22 are notched at 24.

In addition, in order to facilitate inserting the support core 20 into the detector device 10, the front end of the support core 20 is preferably chamfered as shown at 25 in FIG. 4.

The shrinkable sleeve 31 may be coated with a silicone glue, thereby guaranteeing that the assembly stays together and remains sealed. Further, the support core 20 provided with its electrically conductive elements 21 and 22 and optionally extended by the insert 23 may be made by conventional printed circuit techniques.

Figure 5:
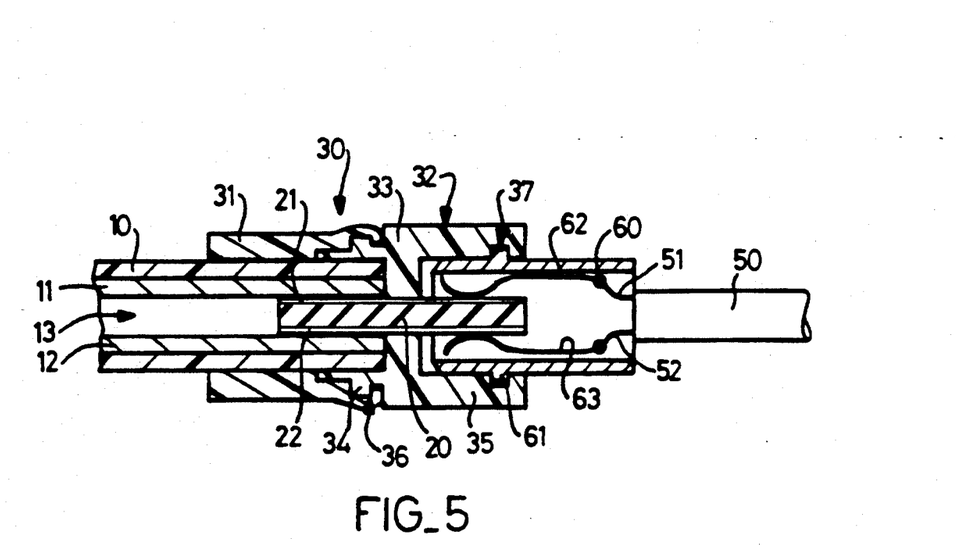
FIG. 5 is a diagrammatic longitudinal section view through a second embodiment of a connection assembly of the present invention.

FIG. 5 shows a detector device comprising a body 10 with two electrically conductive tracks 11 and 12, a support core provided with two electrically conductive elements 21 and 22, and a cable 50 including two link pieces 51 and 52.

Where appropriate, the support core 20 could be fitted with an insert 23.

As shown in FIG. 5, the envelope means 30 comprise a shrinkable sleeve 31 (preferably a heat-shrinkable sleeve) and a box 32.

The box 32 comprises a plate 33, a main socket 34, and a secondary socket 35. The core 20 and the elements 21 and 22 supported thereby pass in sealed manner through the plate 33. The main and secondary sockets 34 and 35 are fixed to respective opposite faces of the plate 33. In other words, the plate extends transversely to the axes of the sockets 34 and 35, which sockets are generally cylindrical in shape.

The main socket 34 is designed to be engaged on the end of the detector device, as shown in FIG. 5. The main socket 34 is preferably provided with an annular groove 36 in its outside surface. The shrinkable sleeve 31 is engaged on the body of the detector device and on the main sleeve 34. Its end penetrates into the annular groove 36. Thus, after shrinking, the shrinkable sleeve 31 provides good system sealing and holds the box 32 on the detector device.

The connection assembly shown in FIG. 5 also includes an endpiece 60. The endpiece is in the form of a generally cylindrical body adapted to be resiliently engaged and held in the secondary socket 35. To this end, and as shown in FIG. 5, the secondary socket 32 is provided on its inside surface with an annular groove 37. In addition, the endpiece 60 is provided on its outside surface with an annular rib 61 which is chamfered towards the front and adapted to be resiliently engaged in the groove 37. The outside diameter of the body of the endpiece 30 is substantially complementary to the inside diameter of the secondary socket 35.

Naturally other dispositions, known per se, may be used for holding the endpiece 60 in the secondary socket 35.

The cable 50 is fixed to the endpiece 60 by any appropriate conventional means.

The endpiece 60 also carries two flexible spring blades 62 and 63 adapted to make contact with respective ones of the electrically conductive elements 21 and 22.

The wires 51 and 52 in the cable 50 are soldered to respective ones of the spring blades 62 and 63.

In order to make a connection using the assembly shown in FIG. 5, the core 20 with its elements 21 and 22 is initially engaged between the tracks 11 and 12, after which the main socket 34 is engaged on the device 10. The heat-shrinkable sleeve 31 which was previously threaded over the assembly is then shrunk. Thereafter the endpiece 60 fitted with the spring blades 62 and 63 connected to the cable 50 is engaged in the secondary socket 35.

The advantage of the embodiment shown in FIG. 5 is that it allows the connection to be disconnected by separating the endpiece 60 while still guaranteeing that the system remains sealed.

Figure 6:
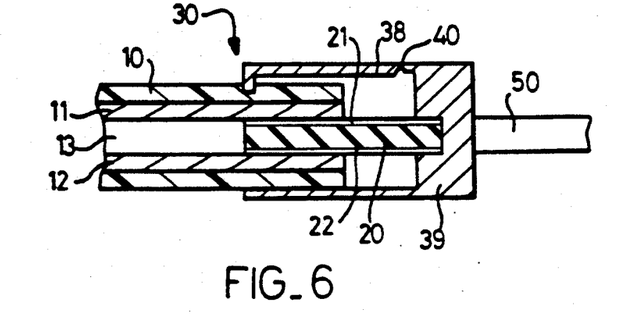
FIG. 6 is a diagrammatic longitudinal section through a third embodiment of a connection assembly of the present invention.

FIG. 6 shows a detector device comprising a body 10 carrying electrically conductive tracks 11 and 12, a support core 20 of electrically insulating material carrying electrically conductive elements 21 and 22, and a two-wire cable 50. In the embodiment shown in FIG. 6, the envelope means 30 comprise a box constituted by two integrally formed shells 38 and 39. The shell 38 is hinged to the shell 39 about a line of weakness 40. The shell 39 carries the support core 20. The shells 38 and 39 are also provided with conventional snap-fastening means 41 and 42, suitable for holding the shells 38 and 39 in a closed position where the two shells 38 and 39 close the end of the detector device 10 together with the support core 20 fitted with the conductive elements 21 and 22, as can be seen in FIG. 6. More precisely, it is preferable for the jaw-forming shells 38 and 39 to have their free ends, when in the closed position, clamping the detector device 10 against the core 20 firstly to press the tracks 11 and 12 against respective ones of the conductive elements 21 and 22, and secondly to improve the sealing of the system.

Figure 7:
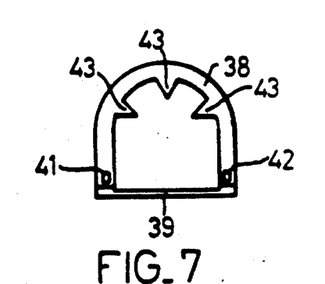
FIG. 7 is a side view of envelope means used in the third embodiment of the invention.

To this end, as shown in FIG. 7, at least one of the shells 38 and 39 may be provided with teeth 43 suitable for engaging the outside surface of the detector device 10.

In order to simplify the illustration, FIG. 6 does not show the electrical connection between the cable 50 and the electrically conductive elements 21 and 22, which connection may be provided by any suitable conventional means.

Figure 8:
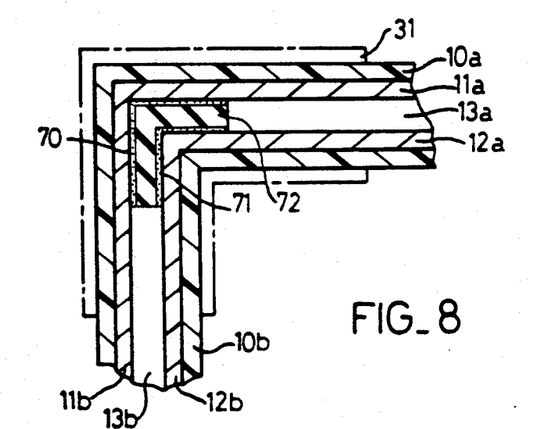
FIG. 8 is a diagrammatic longitudinal section through a connection assembly of the present invention for connecting two non-aligned and separate sections of an obstacle detector device.
Figure 9:
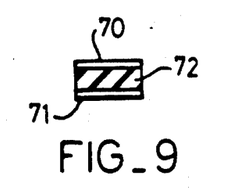
FIG. 9 is a diagrammatic cross-section view through the connection assembly shown in FIG. 8.
Figure 10:
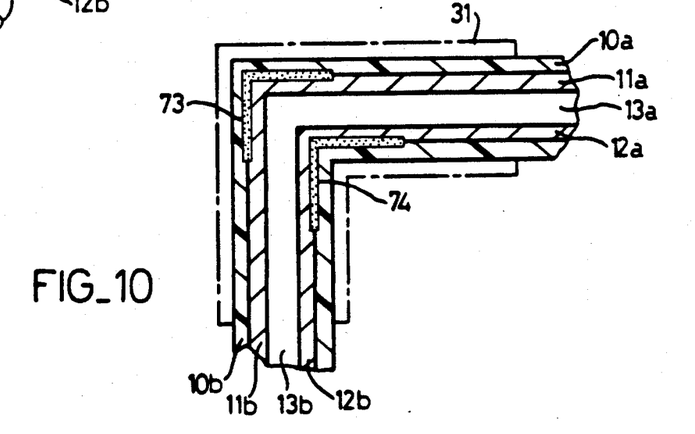
FIG. 10 shows a variant embodiment of the connection assembly for interconnecting two non-aligned and separate sections of an obstacle detector device.

FIGS. 8 to 10 show a connection assembly for connecting two non-aligned and separate sections on an obstacle detector device. These two sections are given respective indices a and b.

In outline, the connection assembly shown in FIGS. 8 to 10, comprises two non-plane electrically conductive elements intended to make contact respectively with electrically conductive tracks 11a and 11b and 12a and 12b.

More precisely, the two non-plane electrically conductive elements as shown in FIGS. 8 to 10 are a ninety degrees shape. The angle of the two non-plane electrically conductive elements corresponds to the desired angle between the two sections of the device to be connected together.

Where appropriate, arcuate electrically conductive elements may be used, corresponding to the desired shape for the detector device sections to be interconnected.

Yet more precisely, as shown in FIGS. 8 and 9, the connection assembly comprises two electrically conductive elements 70 and 71 carried by a generally curved support core 72 and adapted to the desired angle between the two sections of the detection device that are to be interconnected.

The electrically conductive elements 70 and 71 are fixed on the core 72 or are deposited thereon using any appropriate technique known to the person skilled in the art.

Naturally, the section of the core 72 together with its electrically conductive elements 70 and 71 must be complementary to the chamber 13 defined between the tracks 11 and 12.

In the embodiment shown in FIG. 10, the two non-plane electrically conductive elements 73 and 74 are adapted to be engaged between a respective one of the electrically conductive tracks 11a and 11b or 12a and 12b and the tubular body 10 of the detector device.

Where appropriate, and as shown diagrammatically in dot-dashed lines in FIGS. 8 and 10, the two obstacle detector device sections are to be interconnected, carrying respective indices a and b, may be coated with a shrinkable sleeve 31 for improving system sealing.

In a variant, the support core 72 shown in FIG. 8 may be extended beyond the conductive elements 70 and 71 by inserts of electrically insulating material, thereby preventing the tracks 11a and 12a or 11b and 12b making unwanted contact due to the clamping effect of the heat-shrinkable sleeve 31.

Although the two interconnected separate sections of the detector device shown in FIGS. 8 and 10 are inclined at about 90°, the invention is not limited to this particular position.

FIGS. 11 to 14 show a body 10 carrying electrically conductive tracks 11 and 12 and a support core 20 made of electrically insulating material and including electrically conductive elements 21 and 22.

Figure 11:
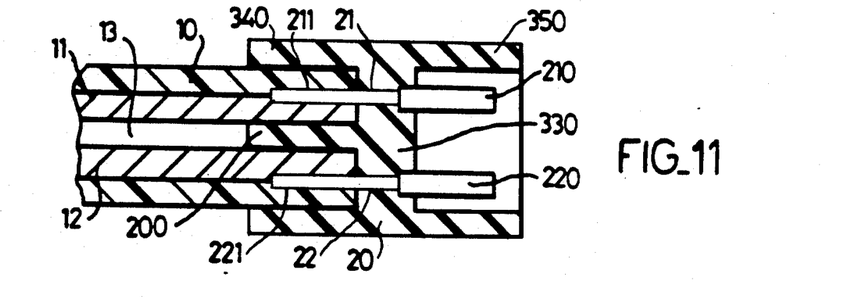
FIGS. 11, 12, 13, and 14 are diagrammatic longitudinal sections through other embodiments of a connection assembly of the present invention.
Figure 12:
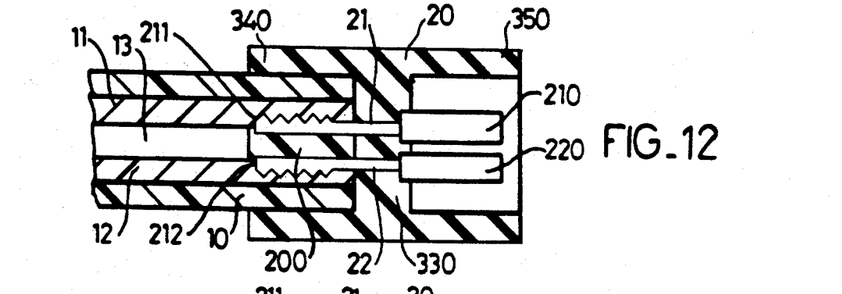
Figure 13:
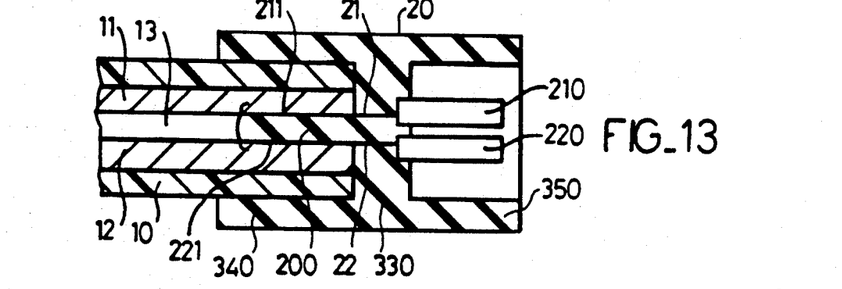

More precisely, in FIGS. 11 to 13, the support core 20 made of electrically insulating material includes a plate 330 extended on respective opposite faces by a main socket 340 and a secondary socket 350.

The electrically conductive elements 21 and 22 pass through the plate 330. The ends of the elements 21 and 22 accessible from the main sleeve 340 are designed to come into contact with respective ones of the tracks 11 and 12. The plate 330 preferably also carries a central finger 200 on the same side as the main socket 340 and complementary to the empty section of the chamber 13 in the detector device.

Figures 11A, 14:
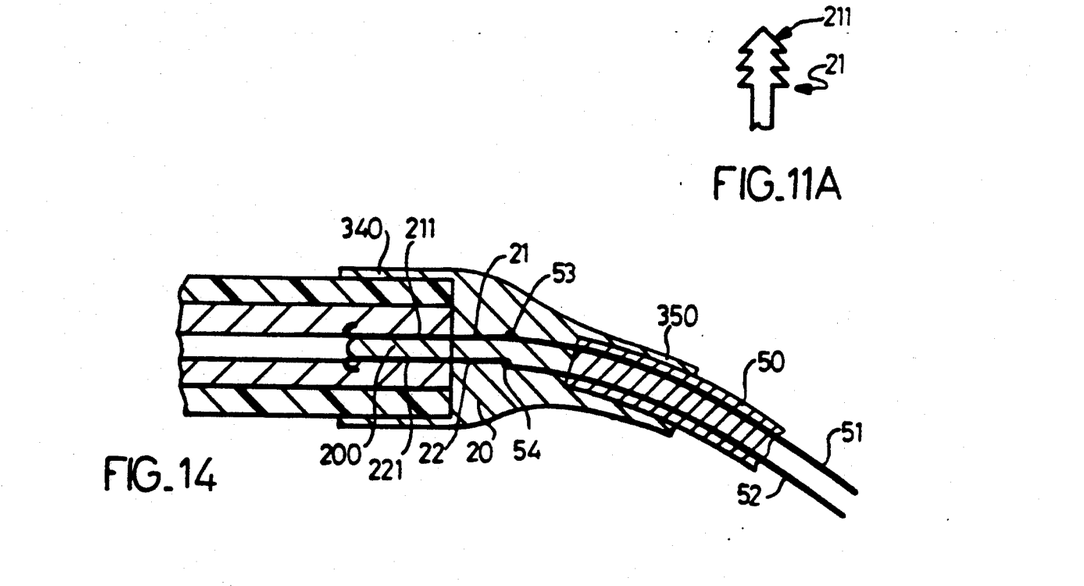
FIG. 11A is a diagrammatic plan view of an electrically conductive element integrated in the connection assembly of FIG. 11.

The ends 210 and 220 of the elements 21 and 22 that are accessible from the secondary socket 350 are designed to form a conventional connector element. More precisely, as shown in FIG. 11, the ends 211 and 221 of the elements 21 and 22 are formed by respective non-coplanar parallel plane spring blades which preferably have teeth as shown in FIG. 11A. These ends 211 and 221 are designed to be engaged between the body 10 and respective ones of the tracks 11 and 12. The ends 211 and 221 are thus at a distance from the central finger 200.

In the example shown in FIG. 12, the ends 211 and 221 of the elements 21 and 22 form non-coplanar parallel plane springs blades which are curved so as to be mechanically held in the tracks 11 and 12.

In FIG. 13, the ends 211 and 221 are carried by the finger 200.

The main socket 340 is made of heat-shrinkable material.

To do this, it is necessary either for the core 20 including the plate 330 and the socket 340 and 350 to be made by molding two materials (with the main socket 340 and the adjacent portion of the plate 330 being made of heat-shrinkable material, or else to overmold a heat-shrinkable element constituting the main socket 340 onto the plate 330, or indeed to make the main socket 340 in the form of a heat-shrinkable sleeve which is added to the system when the connection assembly is utilized).

As shown in FIG. 14, the connection assembly comprises a heat-shrinkable body 20 overmolded on two electrically conductive elements 21 and 22 which are soldered to the wires 51 and 52 of a cable 50. The solder connections are referenced 53 and 54. The body 20 includes a central finger 200 and two sockets 340 and 350 designed to be shrunk respectively onto the body 10 of the detector and onto the cable 50. The ends 21 and 22 shown in FIG. 14 are the same as those shown in FIG. 13. In a variant, they could be the same as those shown in FIGS. 11 and 12.

The cable 50 is itself naturally provided with control means suitable, for example, for generating an alarm or for reversing the direction of displacement of the moving member, if necessary.

Figure 15:
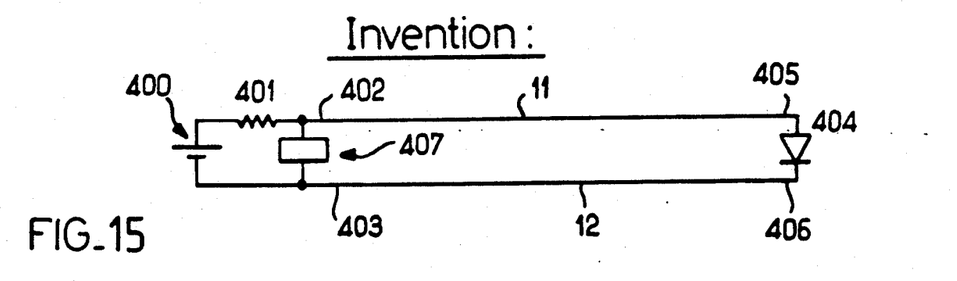
FIGS. 15 and 16 are diagrams showing two embodiments of a system of the present invention including test means.

FIG. 15 shows two electrically conductive tracks 11 and 12 carried in conventional manner on a body of electrically insulating resilient flexible material (not shown in order to simplify the illustration).

A DC electrical power supply 400 is connected via a series resistance 401 to first ends 402 and 403 of the tracks 11 and 12. A blocking diode 404 is connected between the second ends 405 and 406 of the tracks 11 and 12 so that the diode 404 is forward biased. In other words the anode of the diode 404 is connected to second end 405 of track 11 whose first end 402 is connected to the positive power supply terminal of the DC supply 400. The cathode of the diode 404 is connected to the second end 406 of the track 12 whose first end 403 is connected to the negative power supply terminal of the source 400.

Voltage measuring means 407 are connected between the first ends 402 and 403 of the tracks 11 and 12. At rest, the means 407 should detect a voltage equal to the threshold voltage of the diode 404 plus the voltage drop along the tracks 11 and 12, where appropriate. In the event of either of the tracks 11 and 12 breaking, the means 407 detect a voltage equal to the voltage of the source 400 and can therefore generate an appropriate alarm. Naturally, the source 400 must generate a nominal feed voltage which is greater than the threshold voltage of the diode 404.

If an obstacle is detected, then the tracks 11 and 12 make contact with each other, the diode 404 is short-circuited, and the means 407 detect a voltage which is less than the rest voltage.

In this case, the means 407 may act, for example, to reverse the direction of displacement of a window so as to disengage the previously detected obstacle.

Figure 16:
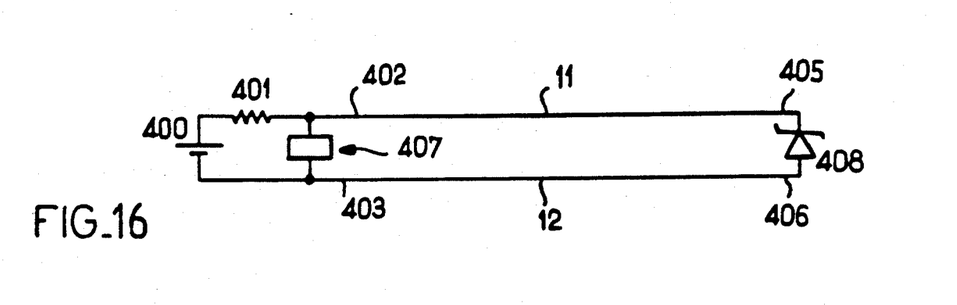

The embodiment of the present invention shown in accompanying FIG. 16 differs from the embodiment shown in FIG. 15 by the blocking diode 404 being replaced by a reverse-biased zener diode 408. I.e. the cathode of the zener diode 408 is connected to the second end 405 of the track 11 which is connected to the positive power supply terminal of the source 400, while the anode of the zener diode 408 is connected to the second end 406 of the track 12 whose first end 403 is connected to the negative power supply terminal of the source 400.

The system shown in FIG. 16 operates in exactly the same way as the system shown in FIG. 15.

At rest, the means 407 detect a voltage equal to the threshold voltage of the zener diode 408 plus the voltage drop along the tracks 11 and 12 where appropriate.

In the event of one or other of the tracks 11 and 12 being cut, then the means 407 detect a voltage equal to the power supply voltage from the source 400.

If an obstacle is detected, the tracks 11 and 12 are brought into contact with each other, the diode 408 is short-circuited, and the means 407 detect a voltage which is lower than the rest voltage.

The tracks 11 and 12 may be made in any conventional way.

Figure 17:
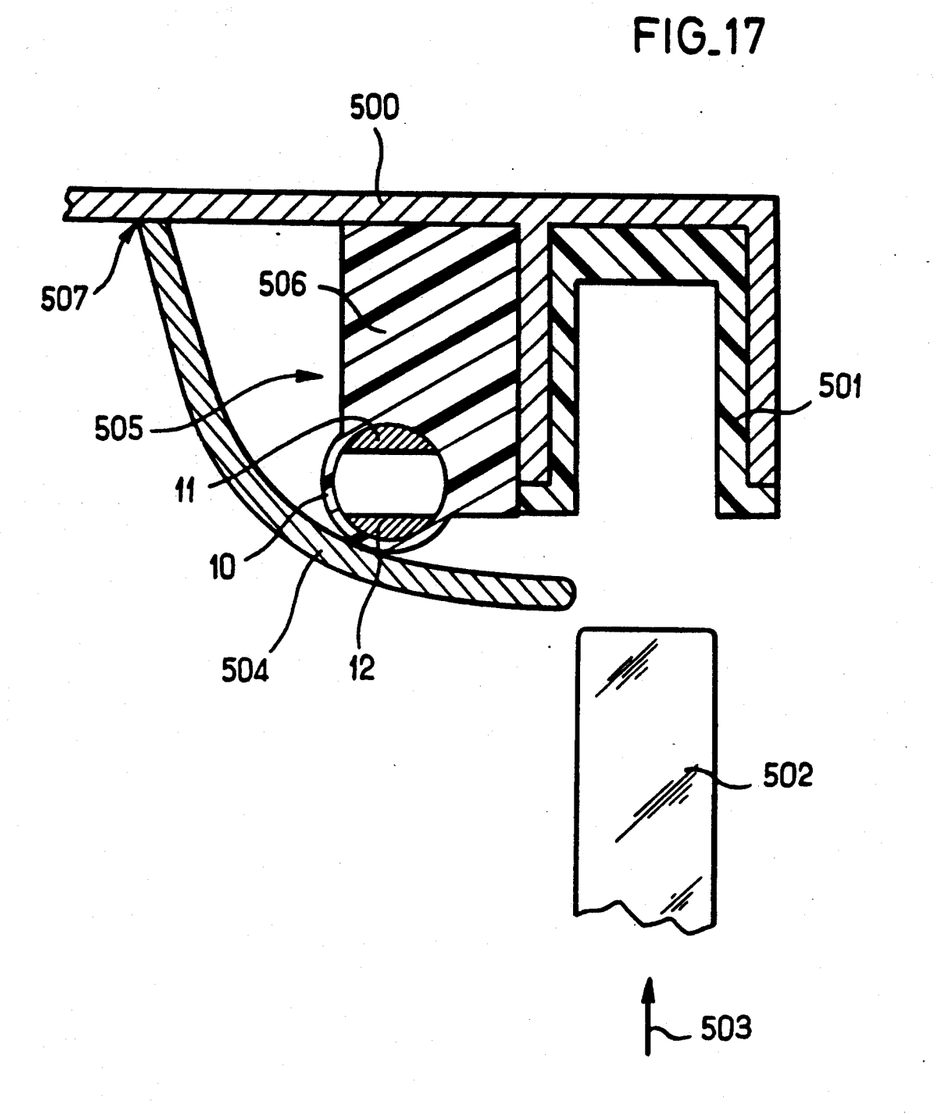
FIG. 17 is a diagram of one embodiment of the invention including a decorative strip.

Accompanying FIG. 17 shows a portion 500 of the window frame in a car door, including a slideway 501 supported by any appropriate conventional means on portion 500 and intended to receive the free top edge of a window 502 which is driven in the direction of arrow 503 (e.g. by means of an electric motor), together with an obstacle detector device 505 and a decorative strip 504.

In accompanying FIG. 17, the obstacle detector device 505 comprises a tubular body 10 of electrically insulating flexible material receiving two electrically conductive tracks or strips 11 or 12. These tracks 11 and 12 may be coextruded with the body 10, for example, and may be made on the basis of the same material but additionally including an electrically conductive filler. At rest, the tracks 11 and 12 are separate. The tubular 10 is fixed on the portion 500 by means of a base 506.

The decorative strip 504 covers the entire device 505. The strip 504 shown in FIG. 17 is in the form of a bar which is curved in section. The strip 504 is hinged to the portion 500 along one of its longitudinal edges 507. Numerous conventional means may be used for making this hinge. For example the strip 504 may merely be stuck to the portion 500 along its edge 507. Where appropriate, it may also be stuck to the tubular body 10.

The person skilled in the art will readily understand that when pressure due to an obstacle interposed on the displacement path of the window 502 is exerted on the strip 504, this pressure is transmitted to the obstacle detector 505, and the resulting deformation of the tubular body 10 brings the two tracks 11 and 12 into contact, thereby enabling an alarm to be generated, e.g. for the purpose of reversing the displacement direction of the window 502, thereby enabling the obstacle to be disengaged.

The decorative strip 504 serves to hide the device 505 without reducing the effective area of the window. It may serve as a lever acting against the device 505 in order to improve the reliability of the detector system.

Naturally the present invention is not limited to the particular embodiments described above, but extends to any variant coming within the scope.

For example, the decorative strip 504 could be guided in translation on the frame 500 rather than being guided in rotation.

In addition, the structure of the obstacle detector device 505 shown in accompanying FIG. 17 is not the only structure possible.

I claim:

1. A system for detecting an obstacle interposed between an electrically-driven motor vehicle window and an associated frame, the system being of the type comprising an obstacle detector device including a flexible and deformable elongate body made of electrically insulating material provided with at least two electrically conductive tracks held apart at rest by resilient flexible means, wherein the system further includes a connection assembly comprising:
   a support core made of electically insulating material;
   at least two separate electrically conductive elements carried by the support core and intended to make contact with respective ones of the tracks when the core is interposed between them; and
   envelope means comprising a heat shrinkable sleeve suitable for engaging the outside surface of the obstacle detector device in order to clamp said obstacle detector device against the support core and its electrically conductive elements in order to maintain electrical contact between the tracks and these elements and also in order to seal the detector device, wherein the support core extends inside the detector device beyond its electrically conductive elements in the form of an insert of electrically insulating material which prevents the clamping effect of the envelope means from bringing the tracks into contact with each other.

2. A detector system for detecting an obstacle interposed between a frame and an associated moving member, the system being of the type comprising an obstacle detector device including at least two electrically conductive tracks held apart at rest by resilient flexible means, said obstacle detector device being supported on at least one of said frame or said associated moving member, wherein the system further includes a connection assembly comprising:
   a support core made of electrically insulating material;
   at least two separate electrically conductive elements carried by the support core and intended to make contact with respective ones of the tracks when the core is interposed between them; and
   envelope means suitable for engaging the outside surface of the obstacle detector device in order to clamp said obstacle detector device against the support core and its electrically conductive elements in order to maintain electrical contact between the tracks and these elements and also in order to seal the detector device,
   wherein the envelope means comprise a box including a plate supporting the core and a main socket suitable for surrounding the detector device.

3. A detector system according to claim 2, wherein the main socket is provided on its outside surface with an annular groove suitable receiving the end of a shrinkable sheath.

4. A detector system according to claim 2, wherein the plate has the core and the electrically conductive element carried thereby passing therethrough.

5. A detector system according to claim 2, wherein the box further includes a secondary socket on the opposite face of the plate to the face carrying the main socket, with the connection assembly including an endpiece suitable for being resiliently engaged in the secondary socket.

6. A detector system according to claim 5, including two flexible spring blades carried by the endpiece and adapted to come into contact with respective ones of the electrically conductive elements.

7. A detector system according to claim 2, wherein said box is constituted by two hinged shells provided with snap-fastening means.

8. A detector system for detecting an obstacle interposed between a frame and an associated moving member, the system being of the type comprising an obstacle detector device including at least two electrically conductive tracks held apart at rest by resilient flexible means, said obstacle detector device being supported on at least one of said frame or said associated moving member, wherein the system further includes a connection assembly comprising:
   a support core made of electrically insulating material, said support core defining a plate;
   at least two separate electrically conductive elements carried by the support core and intended to make contact with respective ones of the tracks when the core is interposed between them; and
   a main socket and a secondary socket extending on opposite faces of said plate so as to form envelope means suitable for engaging the outside surface of the obstacle detector device in order to clamp said obstacle detector device against the support core and its electrically conductive elements in order to maintain electrical contact between the tracks and these elements and also in order to seal the detector device.

9. A detector system according to claim 8, wherein the electrically conductive elements pass through the plate.

10. A detector system according to claim 9, wherein the ends of the electrically conductive elements accessible from the main socket are in the form of non-coplanar toothed parallel plane spring blades designed to be engaged between the body of the detector device and respective ones of the tracks.

11. A detector system according to claim 9, wherein the ends of the electrically conductive elements accessible from the main socket are in the form of toothed coplanar plane spring blades.

12. A detector system according to claim 9, wherein the ends of the electrically conductive elements accessible from the main socket are in the form of curved spring blades.

13. A detector system according to claim 8, wherein the main socket is heat-shrinkable.

14. A detector system according to claim 8, wherein the core is made by two-substance molding, with at least the main socket being made of a heat-shrinkable material.

15. A detector system according to claim 8, wherein the core is made by open molding a heat-shrinkable material on a body of electrically insulating material.

16. A detector system according to claim 8, wherein the ends of the electrically conductive elements accessible in the secondary socket are disposed to constitute a connector.

17. A detector system according to claim 8, wherein the secondary socket is heat-shrinkable.

18. A detector system according to claim 8, wherein the ends of the electrically conductive elements are soldered to wires of a cable.

19. An obstacle detector system for detecting an obstacle interposed between a frame and an associated moving member, the system being of the type comprising an obstacle detector device including a flexible and deformable elongate body made of electrically insulating material provided with at least two electrically conductive tracks held apart at rest by resilient flexible means, said flexible and deformable body being placed on a support fixed to said frame, wherein the system further includes a connection assembly comprising:

a support core made of electrically insulating material;

at least two separate electrically conductive elements carried by the support core and intended to make contact with respective ones of the tracks when the core is interposed between them; and envelope means suitable for engaging the outside surface of the obstacle detector device in order to clamp said obstacle detector device against the support core and its electrically conductive elements in order to maintain electrical contact between the tracks and these elements and also in order to seal the detector device, and a rigid decorative component which is movable relative to the frame and adapted to cover said flexible and deformable elongate body and to compress said resilient flexible means when the rigid decorative component is moved relative to the frame so as to push in contact said two electrically conductive tracks.

20. A system according to claim 19, wherein the decorative component is pivotally mounted relative to the support.

21. A system according to claim 20, wherein the decorative component is mounted to move in translation relative to the support.

22. A system according to claim 19, wherein the decorative component is glued to the support.

23. A system according to claim 19, wherein the decorative component is glued to the detector body.

24. A system according to claim 19, wherein the support is connected to the frame of a motor vehicle door.

* * * * *